US008510614B2

(12) United States Patent
Liu et al.

(10) Patent No.: US 8,510,614 B2
(45) Date of Patent: Aug. 13, 2013

(54) BAD BLOCK IDENTIFICATION METHODS

(75) Inventors: Meng-Chang Liu, Taipei Hsien (TW); Pin-Chou Liu, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 698 days.

(21) Appl. No.: 12/487,773

(22) Filed: Jun. 19, 2009

(65) Prior Publication Data

US 2010/0064187 A1    Mar. 11, 2010

Related U.S. Application Data

(60) Provisional application No. 61/096,009, filed on Sep. 11, 2008.

(51) Int. Cl.
*G11C 29/00* (2006.01)

(52) U.S. Cl.
USPC .......................................... 714/723; 714/722

(58) Field of Classification Search
None
See application file for complete search history.

(56) References Cited

U.S. PATENT DOCUMENTS

| | | | | |
|---|---|---|---|---|
| 6,260,156 B1* | 7/2001 | Garvin et al. | ............... | 714/6.13 |
| 6,877,118 B2* | 4/2005 | Oshima et al. | ............... | 714/719 |
| 7,412,575 B2* | 8/2008 | Park et al. | ............... | 711/159 |
| 7,757,153 B2* | 7/2010 | Hwang et al. | ............... | 714/763 |
| 7,765,426 B2* | 7/2010 | Li | ............... | 714/6.13 |
| 7,991,946 B2* | 8/2011 | Lee et al. | ............... | 711/103 |
| 2005/0286297 A1* | 12/2005 | Roohparvar | ............... | 365/185.03 |
| 2007/0168840 A1* | 7/2007 | Roohparvar | ............... | 714/770 |

FOREIGN PATENT DOCUMENTS

| | | |
|---|---|---|
| CN | 101281788 | 10/2008 |
| CN | 101308702 | 11/2008 |

OTHER PUBLICATIONS

English language translation of abstract of CN 101281788 (published Oct. 8, 2008).
English language translation of abstract of CN 101308702 (published Nov. 19, 2008).

* cited by examiner

*Primary Examiner* — Daniel McMahon
(74) *Attorney, Agent, or Firm* — McClure, Qualey & Rodack, LLP

(57) ABSTRACT

A bad block identification method for a memory is provided. The memory includes at least one memory block for storing data. A data decoding function is performed on the data, and it is determined whether the data decoding function was performed successfully. If the data decoding function was not performed successfully, at least one predetermined location in the memory block is checked. It is determined whether the predetermined location is marked by predetermined information. If the predetermined location is not marked by the predetermined information, the memory block is identified as a bad block.

16 Claims, 4 Drawing Sheets

BAD BLOCK IDENTIFICATION METHODS

CROSS REFERENCE TO RELATED APPLICATIONS

The present application claims the benefit of U.S. provisional application entitled "BAD BLOCK IDENTIFICATION METHOD FOR FLASH MEMORY", Ser. No. 61/096,009, filed Sep. 11, 2008.

BACKGROUND

1. Technical Field

The disclosed embodiments relate to a bad block identification method, and more particularly to a bad block identification method for NAND flashes with various data formats.

2. Description of the Related Art

NAND flash vendors specify predetermined information for identifying memory blocks of an NAND flash being good or bad. The locations in the memory blocks where the predetermined information is placed on are also specified by the NAND flash vendors. FIG. 1 shows a conventional data format of one page in a memory block of one NAND flash. Referring to FIG. 1, the conventional data format of one page comprises one data area DA and one spare area SA, and the spare area SA follows the data area DA. In this data format, data is written in a conglomerated area (that is the data area). Generally, NAND flash vendors specify the first byte B-1th of the spare area SA to be marked by predetermined information related to bad block identification when a program/erase operation to the memory block fails. That is, if the first byte B-1th of the spare area SA is marked by the predetermined information, the memory block is identified as a bad block. In most prior arts, the first byte B-1th of the spare area SA is marked by "0xFF" to indicate that the corresponding memory block is good, while the first byte B-1th of the spare area SA is marked by a non-0xFF value such as "0x00" to indicate that the corresponding memory block is bad. However, NAND flash controllers may apply various data formats of memory pages, which are different from the conventional data format in FIG. 1, and write data according to different rules. Thus, the first byte B-1th of the spare area SA may be overwritten by the written data, so that the bad block detection by checking the first byte B-1th of the spare area SA is not applicable to the NAND flashes with the various data formats.

SUMMARY

An exemplary embodiment of a bad block identification method for a memory is provided. The memory comprises at least one memory block for storing data. The bad block identification method comprises the steps of: performing a data decoding function on the data; determining whether the data decoding function was performed successfully; checking at least one predetermined location in the memory block if the data decoding function was not performed successfully; determining whether the at least one predetermined location is marked by predetermined information; and identifying the memory block as a bad block if the at least one predetermined location is not marked by the predetermined information.

An exemplary embodiment of a method for writing data into a memory is provided. The memory comprises a plurality of memory blocks. The method comprises the steps of: identifying a first memory block among the plurality of memory blocks as a good block or a bad block; adding a data mark into the data at least one data-mark location in the first memory block if the first memory block is identified as a good block; performing a data encoding function on the data with the data mark; and writing the encoding data into the first memory block.

In some embodiments, the method further comprises the steps of: skipping the first memory block if the first memory block is identified as a bad block; and identifying a second memory block among the plurality of the memory blocks, which is next to the first memory block, as a good block or a bad block.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
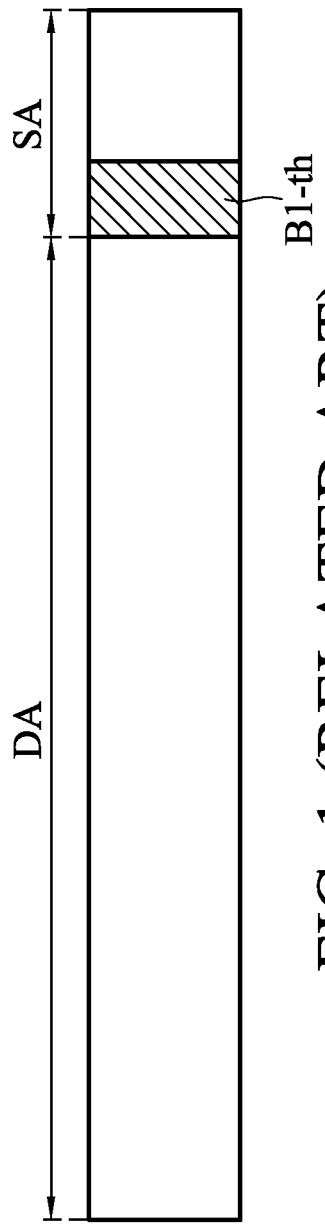
FIG. 1 shows a data format of one page in a memory block of a conventional NAND flash.
Figure 2:
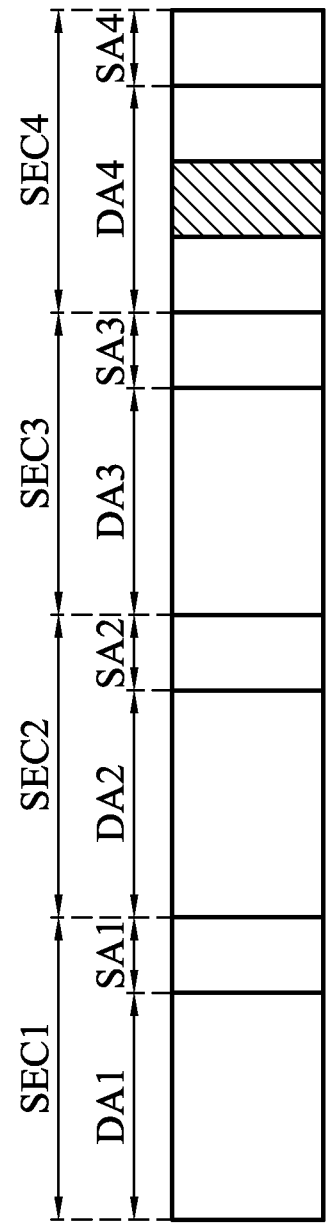
FIG. 2 shows an exemplary embodiment of a data format of a page in a memory block.

Bad block identification methods are provided. An exemplary embodiment of a bad block identification method is applied to a memory which comprises at least one memory block for storing data. The memory block comprises at least one page. FIG. 2 shows a data format of the page. Referring to FIG. 2, for writing data into the memory block by a scrambling manner, the page is divided into a plurality of sectors SEC, and each sector comprises one data area and one spare area following the corresponding data area DA. In the embodiment, four sectors SEC1-SEC4 are given as an example. The sector SEC1 comprises one data area DA1 and one spare area SA1, the sector SEC2 comprises one data area DA2 and one spare area SA2, the sector SEC3 comprises one data area DA3 and one spare area SA3, and the sector SEC4 comprises one data area DA4 and one sappa area SA4. Specifically, the data areas DA1-DA4 and the spare areas SA1-SA4 are arranged alternately. It should be noted that the arrangement of the data areas and spare areas in FIG. 2 is given as an example without limitation. Referring to the arrangement of FIGS. 1 and 2, the first byte B-1th of the spare area SA in FIG. 1 corresponds to a location in the data area DA4 of the sector SEC4 in FIG. 2 (represented by a slash area). Thus, when programming the memory block in FIG. 2, the bad block information in the first byte B-1th of the spare area SA in FIG. 1 corresponding to the slash area in the data area DA4 of FIG. 2 may be overwritten by data.

Figure 3:
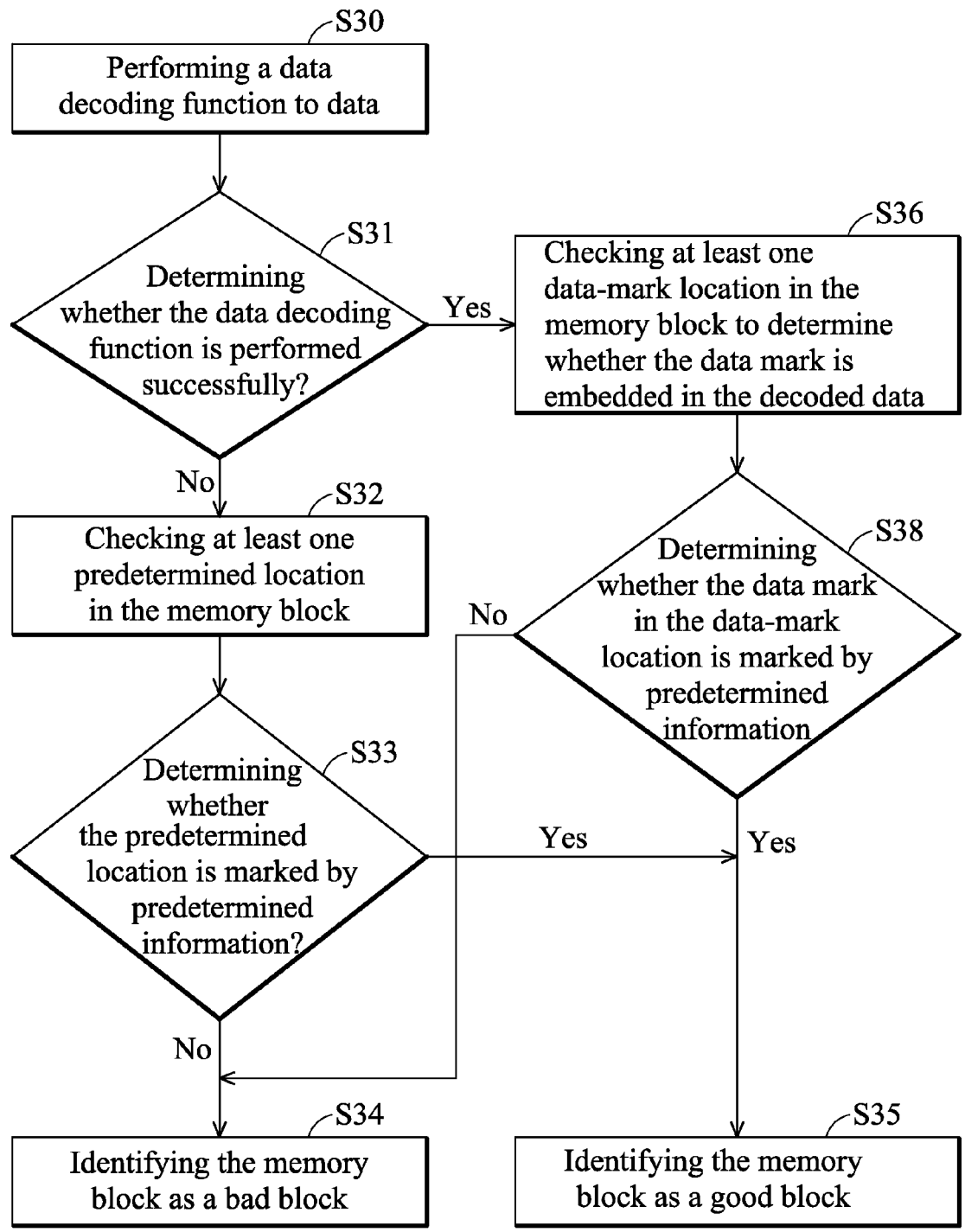
FIG. 3 is a flow chart of an exemplary embodiment of a bad block identification method.

FIG. 3 is a flow chart of the exemplary embodiment of the bad block identification method. First, a controller performs a data decoding function on the data stored into a memory block of a memory, such as a NAND flash (step S30). In the embodiment, the data decoding function performs error-correction code (ECC) decoding. Then, the controller determines whether the data decoding function was performed successfully (step S31). An unsuccessful data decoding function means that the memory block was either not written before or identified as a bad block during the previous writing operation and the data is thus not encoded with a data mark. Accordingly, if the data decoding function was not performed successfully, the controller then checks at least one predetermined location in the memory block (step S32). The predetermined location is specified by a memory vendor for identifying the status of the memory block, such as the first byte B-1th of the spare area SA in FIG. 1. In some embodiments, the memory block comprises a plurality of pages, and the controller checks three predetermined locations respectively placed on the first page, the second page, and the last page among the pages. In the embodiment, one predetermined location is given as an example.

The controller determines whether the predetermined location is marked by predetermined information (such as "0xff") specified by the memory vendor (step S33). If the predetermined location is marked by the predetermined information, the controller identifies the memory block as a good block (step S35). In the step S33, if the predetermined location is not marked by the predetermined information ("0xff") but marked by another information such as "0x00", the controller identifies the memory block as a bad block (step S34). In some embodiments in which there are three predetermined locations to be checked, the controller determines whether the three predetermined locations are marked by the predetermined information specified by the memory vendor. The controller identifies the memory block as a bad block if one of the three predetermined locations is not marked by the predetermined information, while the controller identifies the memory block as a good block if all of the three predetermined locations are marked by the predetermined information.

In the step S31, the successful data decoding function means that the memory block was a good block during the previous writing operation and the data is encoded with the data mark. For enhancing block identification, if the data decoding function was performed successfully, the controller further checks at least one data-mark location in the memory block to determine whether the data mark is embedded in the decoded data (step S36). The data mark in the data-mark location in the memory block is predetermined information specified and written by users for indicating whether the memory block is good or bad in accordance with the data format thereof. In the embodiment, the data-mark location is different from the predetermined location in the memory block. For example, for the data format shown in FIG. 2, the data mark is placed in the first byte of each of the spare areas SA1~SA4. The controller then determines whether the data mark in the data-mark location is marked by predetermined information (step S38). If the data mark in the data-mark location is not marked by the predetermined information, the controller identifies the memory block as a bad block (step S34), while if the data mark is marked by the predetermined information, the controller identifies the memory block as a good block (step S35). For example, if the data mark is marked by predetermined information such as "0xFF", the memory block is identified as a good block. Conversely, if the data mark is not marked by non-predetermined information, such as "0x00", the memory block is identified as a bad block.

According to the bad block identification method of FIG. 3, the data decoding function is performed first, and the predetermined location is then checked. Whether the data is encoded depends on whether the data decoding function was successful. An unsuccessful data decoding function means the data was not encoded with the data mark and not written during the previous writing operation. Thus, the predetermined location specified by the memory vendor for such as the first byte B-1th of the spare area SA in FIG. 1 is not overwritten by the data, and the status of the memory block can be identified by checking the predetermined location. Thus, a memory block can be identified as a good block or a bad block even if a data format of the memory does not conform to the data format specified by the memory vendor.

Figure 4:
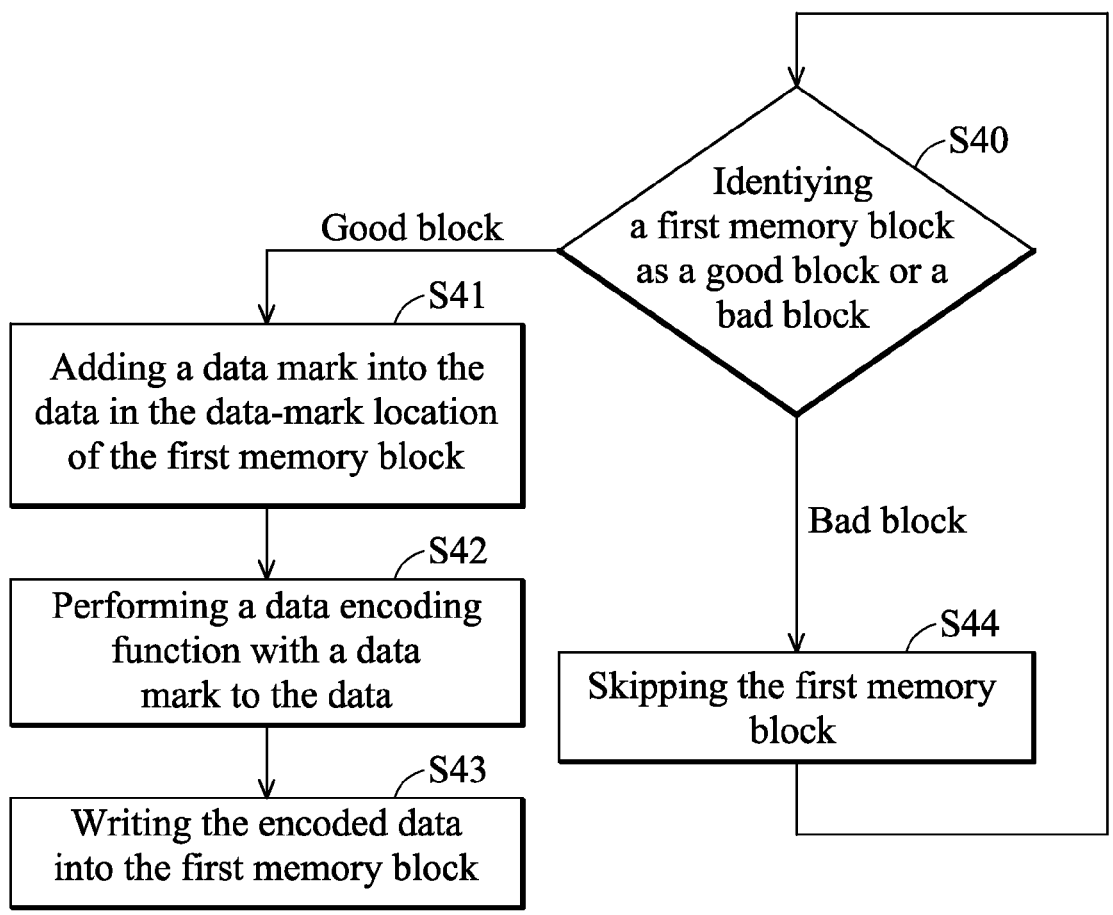
FIG. 4 is a flow chart of a exemplary embodiment of a method for writing data into a memory.

FIG. 4 is a flow chart of an exemplary embodiment of a method for writing data into a memory. The memory comprises a plurality of memory blocks. First, a controller identifies a first memory block among the memory blocks as a good block or a bad block (step S40). If the controller identifies the first memory block as a good block, the controller adds a data mark into the data in the data-mark location in the first memory block, indicating the first memory block is a good block (step S41). Then, the controller performs a data encoding function on the data with the data mark (step S42) and writes the encoded data into the first memory block (step S43). In the step S40, if the controller identifies the first memory block as a bad block, the controller skips the first memory block (step S44) and proceed to identify a next memory block (the second memory block) as a good block or a bad block (back to the step S40).

In an embodiment, the step S40 can be implemented by the method shown in FIG. 3. The controller first performs a data decoding function to the data in the step S30, and the controller then determines whether the data decoding function was performed successfully (step S31). Accordingly, the controller checks at least one predetermined location specified by a memory vendor in the first memory block (step S32) or at least one data-mark location in the first memory block to determine whether a data mark is embedded in the decoded data (step S36), in accordance with the result of step S31. If the result in step S31 is No, the controller then determines whether the predetermined location is marked by predetermined information (such as "0xff") specified by the memory vendor (step S33). If the predetermined location is marked by the predetermined information, the controller identifies the first memory block as a good block (step S35), and the method proceeds to the step S41. In the step S33, if the predetermined location is not marked by the predetermined information ("0xff") but marked by another information "0x00", the controller identifies the first memory block as a bad block (step S34), and the method proceeds to the step S44. Alternatively, if the result in step S31 is Yes, the controller determines whether the data mark in the data-mark location is marked by the predetermined information (such as "0xff") (step S38). If the data-mark location is marked by the predetermined information, the controller identifies the first memory block as a good block (step S35), and the method proceeds to the step S41. In the step S38, if the data-mark location is not marked by the predetermined information ("0xff") but marked by another information "0x00", the controller identifies the first memory block as a bad block (step S34). Thus, when the pages of the first memory block have the data format of FIG. 2, the first memory block can be identified as a bad block or a bad block according to the method shown in FIG. 3.

Figure 5:
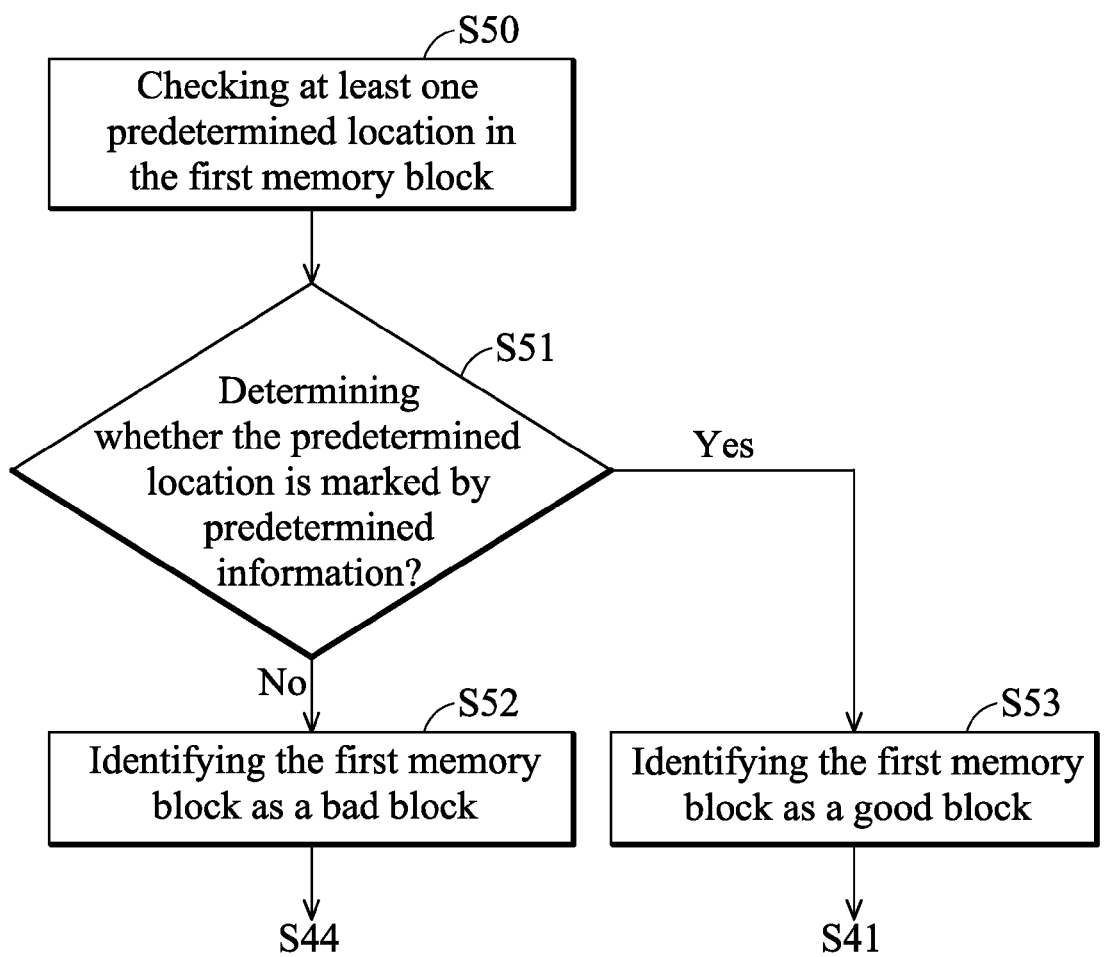
FIG. 5 is a flow chart of an exemplary embodiment of a bad block identification method for the method in FIG. 4.

In some embodiments, the pages of the first memory block may have the conventional data format specified by the flash vendor, as shown in FIG. 1. Accordingly, the step S40 comprises steps of FIG. 5 for the conventional page data format. Referring to FIG. 5, the controller checks at least one predetermined location in the first memory block (step S50) and then determines whether the predetermined location is marked by predetermined information (such as "0xff") specified by the NAND flash vendor (step S51). If the predetermined location is marked by the predetermined information, the controller identifies the first memory block as a good block (step S52), and the method of FIG. 4 proceeds to the step S41. If the predetermined location is not marked by the predetermined information, the controller identifies the first memory block as a bad block (step S52), and the method of FIG. 4 proceeds to the step S44.

According to the embodiment of FIG. 5, even if the data format of the page of the first memory block does not conform with the data format specified by the memory vendor, the status of the first memory block can be identified, so that the data can be written into the first memory block or the data writing is performed to the next memory block by skipping the first memory block.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bad block identification method for a memory, the memory comprising at least one memory block for storing data, and the bad block identification method comprising:
   performing a data decoding function on the data;
   determining whether the data decoding function was performed successfully based on a memory block status corresponding to a previous writing operation and based on data stored in at least one data-mark location of the memory block;
   in response to determination of an unsuccessful data decoding function, checking at least one predetermined location in the memory block;
   determining whether the at least one predetermined location is marked by predetermined information; and
   identifying the memory block as a bad block in response to a determination that the at least one predetermined location is marked by information other than the predetermined information, wherein the at least one data-mark location is different than the predetermined location.

2. The bad block identification method as claimed in claim 1 further comprising identifying the memory block as a good block if the at least one predetermined location is marked by the predetermined information.

3. The bad block identification method as claimed in claim 1, wherein determining whether the data decoding function was performed successfully based on data stored in the at least one data-mark location of the memory block comprises:
   checking the at least one data-mark location in the memory block;
   determining whether the at least one data-mark location is marked by the predetermined information; and
   identifying the memory block as a bad black if the at least one data-mark location is not marked by the predetermined information.

4. The bad block identification method as claimed in claim 3 further comprising:
   identifying the memory block as a good block if the at least one data-mark location is marked by the predetermined information.

5. The bad block identification method as claimed in claim 3, wherein the at least one data-mark location is the first byte of a spare area of the memory.

6. The bad block identification method as claimed in claim 1, wherein the data decoding function performs error-correction code (ECC) decoding.

7. A method for writing data into a memory comprising a plurality of memory blocks, comprising:
   identifying a first memory block among the plurality of memory blocks as a good block or a bad block, wherein identifying the first memory block comprises:
   performing a data decoding function on the data;
   determining whether the data decoding function was performed successfully based on a memory block status corresponding to a previous writing operation and based on data stored in at least one data-mark location of the memory block;
   checking one of the data-mark location and a predetermined location in the first memory block in response to the determination result of whether the data decoding function was performed successfully;
   identifying the first memory block as a good block if the checked location is marked by predetermined information;
   adding a data mark into at least one data-mark location in the first memory block if the first memory block is identified as a good block;
   performing a data encoding function on the data with the data mark; and
   writing encoded data into the first memory block.

8. The method as claimed in claim 7 further comprising:
   skipping the first memory block if the first memory block is identified as a bad block; and
   identifying a second memory block among the plurality of the memory blocks, which is next to the first memory block, as a good block or a bad block.

9. The method as claimed in claim 7, wherein in the first memory block, the data-mark location is different from the predetermined location.

10. The method as claimed in claim 7, wherein the data decoding function performs error-correction code (ECC) decoding.

11. The method as claimed in claim 7, wherein the step of identifying the first memory block comprises:
    checking at least one predetermined location in the first memory block;
    determining whether the at least one predetermined location is marked by predetermined information; and
    identifying the first memory block as a good block if the at least one predetermined location is marked by the predetermined information.

12. The method as claimed in claim 7, wherein the first memory block comprises at least one page having a data area and a spare area, and the at least one data-mark location is on the first byte of the spare area.

13. A block characterization method for a memory including at least one memory block for storing data, the method comprising:
    performing a decoding operation on the data;
    determining whether the data decoding function was performed successfully based on a memory block status corresponding to a previous writing operation and based on data stored in at least one data-mark location of the memory block;
    in response to unsuccessful decoding of the data, checking at least one predetermined location in the at least one memory block;

determining whether the at least one predetermined location is marked by predetermined information; and identifying the memory block as a good block in response to a determination that the at least one predetermined location is marked by the predetermined information.

14. The method of claim 13, wherein the predetermined information is specified by a vendor of the memory.

15. The method of claim 13, further comprising:

adding a data mark into the at least one data-mark location in the at least one memory block if the at least one memory block is identified as a good block;

performing an encoding function on the data with the data mark; and writing the encoded data into the at least one memory block.

16. The method of claim 15, wherein the at least one data-mark location is different than the at least one predetermined location.

* * * * *